United States Patent [19]
Usimaru

[11] Patent Number: 5,315,185
[45] Date of Patent: May 24, 1994

[54] SWITCHING NOISE CANCELLING SYSTEM IN A SPACE DIVERSITY RECEIVING SYSTEM

[75] Inventor: Imao Usimaru, Kawasaki, Japan
[73] Assignee: Fujitsu Limited, Kawasaki, Japan
[21] Appl. No.: 952,406
[22] Filed: Sep. 30, 1992
[51] Int. Cl.⁵ .......................................... H04B 15/00
[52] U.S. Cl. .................... 307/520; 328/163; 328/167
[58] Field of Search ............... 307/520, 521; 328/163, 328/167

[56] References Cited

U.S. PATENT DOCUMENTS

| | | | |
|---|---|---|---|
| 4,587,620 | 5/1986 | Niimi et al. | 328/163 |
| 4,701,715 | 10/1987 | Amazawa et al. | 307/520 |
| 4,914,398 | 4/1990 | Jove et al. | 307/520 |

FOREIGN PATENT DOCUMENTS 59-17740  1/1984  Japan .
2-39629   2/1990  Japan .
3-35619   3/1991  Japan .

*Primary Examiner*—John T. Kwon
*Attorney, Agent, or Firm*—Armstrong, Westerman, Hattori, McLeland & Naughton

[57] ABSTRACT

A switching noise cancelling system in a space diversity receiving system, comprising a comparator for comparing two receiving signal levels received by two antennas to provide a high level signal or a low level signal in response to the result of the comparison, a first switch for selecting, in response to the output signal of the comparator, one of two signals received by the antennas, a noise generating unit for generating noises substantially the same as noises generated by the switch, and a noise cancelling unit for cancelling the noises generated by the first switch by using the noises generated by the noise generating unit, whereby noises generated by the switch are canceled.

5 Claims, 6 Drawing Sheets

SWITCHING NOISE CANCELLING SYSTEM IN A SPACE DIVERSITY RECEIVING SYSTEM

BACKGROUND OF THE INVENTION

1. Filed of the Invention

The present invention relates to a switching noise cancelling system in a space diversity receiving system, and more particularly to a system for removing a switching noise generated at the output of a switch in a space diversity receiving unit.

As space diversity receiving methods, there are generally two methods, i.e., a first method for detecting, from signals from two receiving antennas, a receiving signal having a higher level, and then selecting the detected receiving signal, and a second method for controlling the phases of the receiving signals from two receiving antennas to have the same phase, and synthesizing the two receiving signals. Various research into each of the methods has been carried out. From a view point of easy construction, the first method which does not require a construction for synthesis if preferred over the second method.

The present invention relates to the first method.

2. Description of the Related Art

In the first method, a switch is used to select the higher level receiving signal. Conventionally, noises are generated at the output of the switch. The noises are generated at the time of the switching operation because the voltages of the receiving signals applied to the switch are not always the same. The difference in the voltages is caused due to the difference of the characteristics of the receivers or due to a leakage current in the switch.

SUMMARY OF THE INVENTION

Accordingly, an object of the present invention is to provide a switching noise cancelling system in a space diversity receiving system for comparing the receiving levels of the signals from two antennas and selecting, by a switch, a higher level receiving signal, in which a switching noise is removed from the output of the switch.

To attain the above object, there is provided, according to the present invention, a switching noise cancelling system in a space diversity receiving system. The switching noise cancelling system comprises: a comparator for comparing two receiving signal levels received by two antennas to provide a high level signal or a low level signal in response to the result of the comparison; a first switch, operatively connected to the output of the comparator and two the two antennas, for selecting, in response to the output signal of the comparator, one of two signals received by the antennas; a noise generating unit, operatively connected to the output of the comparator, for generating noises substantially the same as noises generated by the switch; and a noise cancelling unit, operatively connected to the outputs of the switch and the noise generating means, for cancelling the noises generated by the first switch by using the noises generated by the noise generating unit.

In the above switching noise cancelling system, the first switch is a semiconductor switch.

Preferably, the noise generating unit comprises: an inverter, operatively connected to the output of the comparator, for inverting the output signal of the comparator; and a level adjusting unit, operatively connected to the inverter, for generating the noises substantially the same as noises generated by the first switch.

According to another aspect of the present invention, the noise generating means comprises: a second switch, operatively connected to the output of the comparator and two direct current voltages, for selecting, in response to the high level signal or the low level signal of the output signal of the comparator, one or the other of the two direct current voltages, the two direct current voltages being so determined that the output of the second switch is substantially the same as the switching noise generated by the first switch.

Preferably, the noise cancelling unit is an adding unit for adding the output of the first switch and the output of the noise generating unit.

BRIEF DESCRIPTION OF THE DRAWINGS

The above object and the features of the present invention will be more apparent from the following description of the preferred embodiments with reference to the drawings, wherein.

DESCRIPTION OF THE PREFERRED EMBODIMENTS

For better understanding of the present invention, a conventional space diversity receiving unit is first described with reference to FIG. 1 and FIGS. 2A to 2D.

Figure 1:
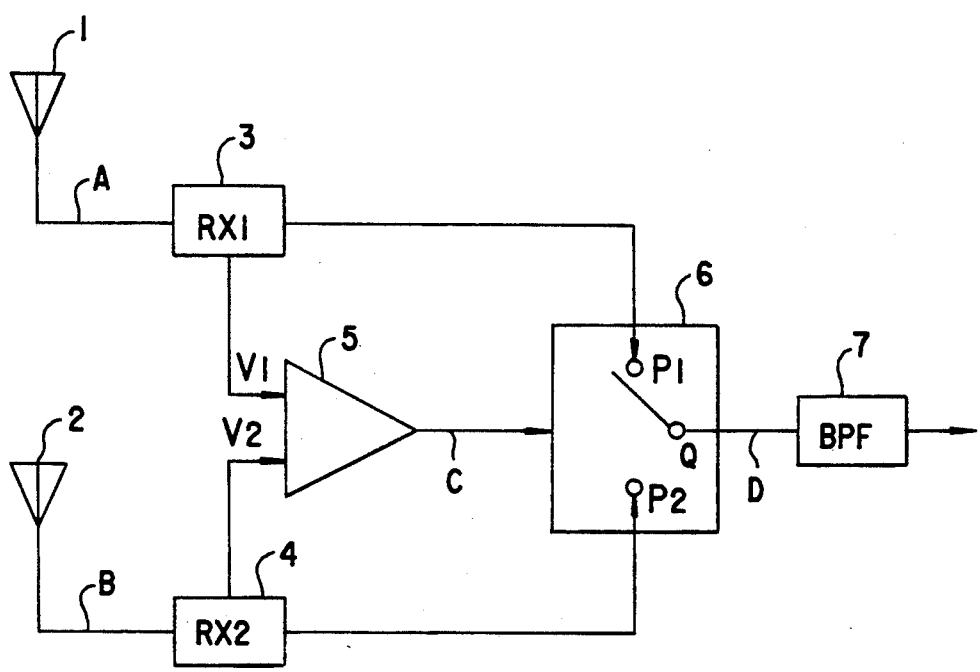
FIG. 1 is a block diagram showing a conventional space diversity receiving unit.
Figure 2:
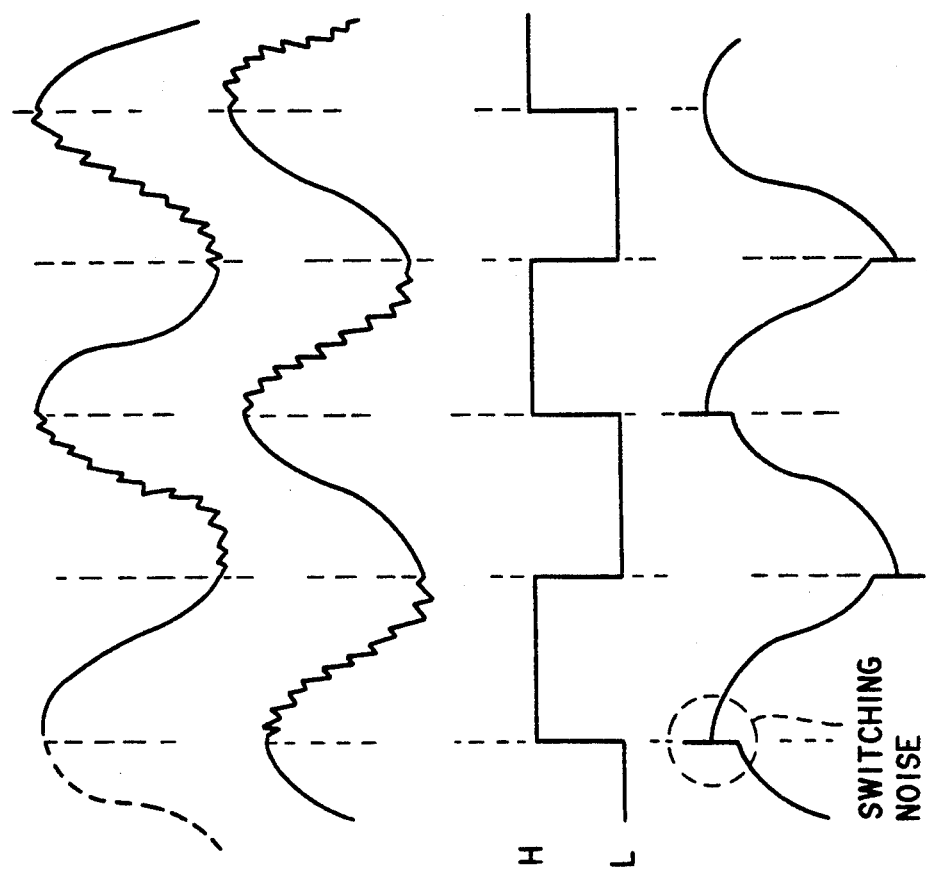
FIGS. 2A to 2D are waveform diagrams explaining the operation of the conventional unit shown in FIG. 1.

FIG. 1 shows the construction of the conventional space diversity receiving unit, and FIGS. 2A to 2D are waveform diagrams explaining the operation of the unit in FIG. 1. FIG. 2A shows a waveform of a receiving signal A from an antenna 1, and FIG. 2B shows a waveform of a receiving signal B from an antenna 2. In these waveforms, smooth curves represent that there is no noise in the receiving signal, and sawtooth waveforms represent that there are noises in the receiving signal. In the period when there is no noise, the receiving signal is received at a higher electric field intensity. In the period when there are noises, the receiving signal is received at a lower electric field intensity. The electric field intensity of the receiving signal A is converted into a voltage $V_1$ by a receiver (RX1) 3. The electric field intensity of the receiving signal B is converted into a voltage $V_2$ by a receiver (RX2) 4. The voltages $V_1$ and $V_2$ are compared by a comparator 5 to output a signal C as shown in FIG. 2C. The waveform of the signal C shown in FIG. 2C has a high level "H" when the level of the receiving signal A is higher than the level of the receiving signal B, and has a low level "L" when the level of the receiving signal B is higher than the level of the receiving signal A. In accordance with the level of the waveform shown in FIG. 2C, a switch 6 selects the receiving signal A or the receiving signal B to be output to a band-pass filter (BPF) 7.

At the output of the switch 6, however, as shown in FIG. 2D, a switching noise is generated each time switching occurs. The main reason why the switching noise is generated is because the switch 6 is generally constructed by a semiconductor switch. The semiconductor switch is generally constructed of MOS transistors. In the semiconductor switch, when an input terminal P is connected to an output terminal Q, and when an input terminal $P_2$ is disconnected from the output terminal Q, the impedance between the input terminal $P_1$ and the output terminal Q is very low and the impedance between the input terminal $P_2$ and the output terminal Q is very high. Even when the impedance between the input terminal $P_2$ and the output terminal Q is very high, namely, even when the input terminal $P_2$ is in an open state, a leakage current flows between a power supply line and the input terminal $P_2$ or between the input terminals $P_1$ and $P_2$ so that the potential at the input terminal $P_2$ is raised. This potential rise causes the voltage difference at the time of switching. Another reason for the switching noise is that the characteristics of the receivers 3 and 4 are not always the same. Therefore, the output levels of the receivers 3 and 4 are not always the same.

Further, by using the semiconductor switch, a pulse is generated each time switching occurs. This pulse is also switching noise.

The present invention has an object to eliminate the above-mentioned noise generated at the switching timing.

Embodiments of the present invention will be described in the following.

Figure 3:
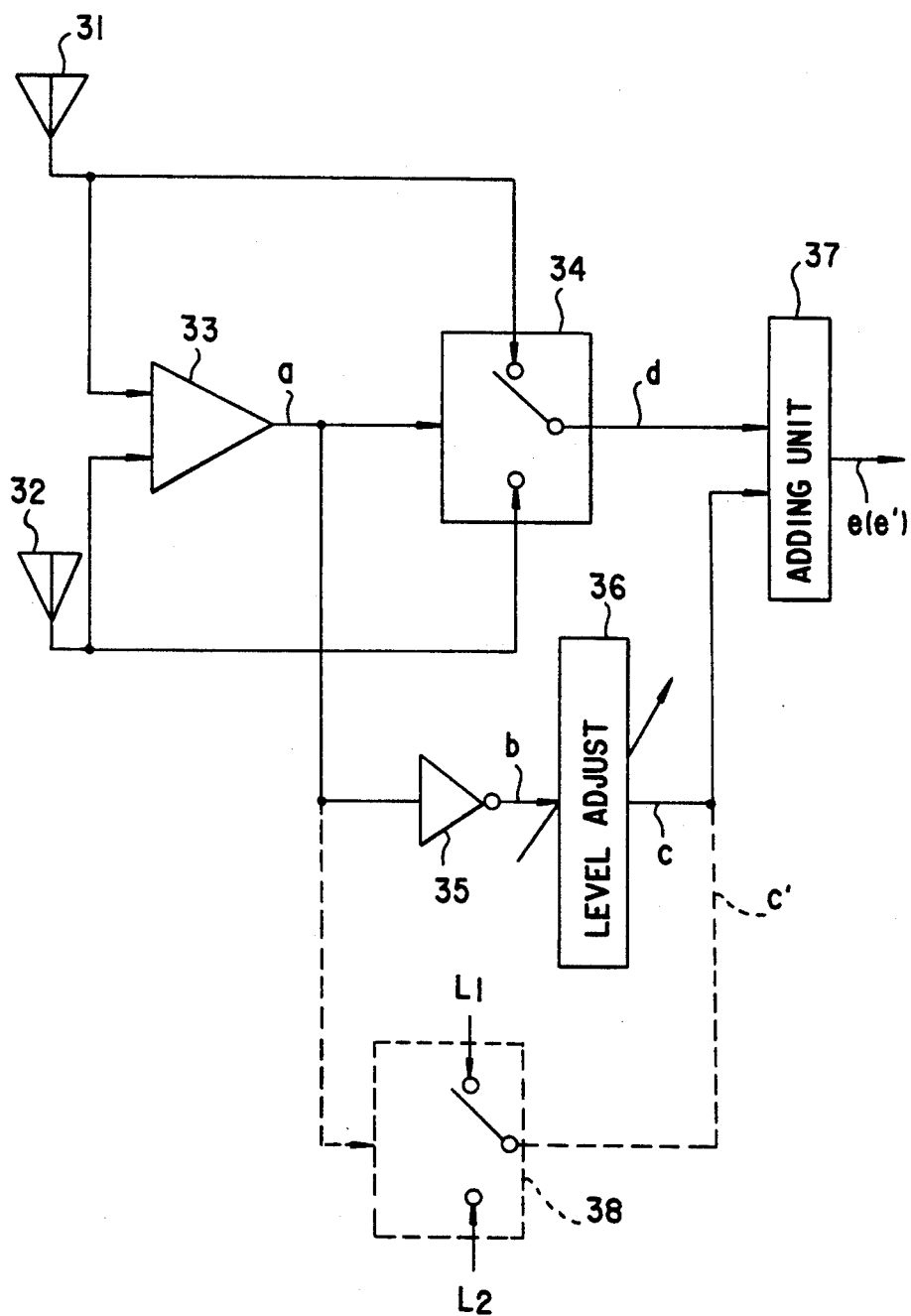
FIG. 3 is a block diagram generally showing the principle of the present invention.

FIG. 3 is a block diagram generally showing the principle of the present invention. As shown in FIG. 3, a space diversity receiving unit according to the present invention includes a comparator 33 for comparing a level of a signal from an antenna 31 and a level of a signal from another antenna 32 to provide a high level (ON) output signal or a low level (OFF) output signal, a semiconductor switch 34 for connecting the antenna 31 or the antenna 32 in response to the output level of the comparator 33, an inverter 35 for inverting the output level of the comparator 33, a level adjusting unit 36 for generating a signal having a level sufficient to cancel the switching noise from the output of the switch 34, and an adding unit 37 for adding the output signal from the level adjusting unit 36 and the receiving signal selected by the switch 34 to cancel the switching noise from the output of the switch 34.

Alternatively, instead of providing the inverter 35 and the level adjusting unit 36, a second semiconductor switch 38 may be provided as illustrated by dotted lines, according to another aspect of the present invention. The characteristic of the second switch 38 is substantially the same as that of the first semiconductor switch 34. The second semiconductor switch 38 selects either one of two direct current voltage levels $L_1$ and $L_2$ in accordance with the ON level or the OFF level of the output signal from the comparator 33. The voltage levels $L_1$ and $L_2$ are appropriately determined to cancel the noises from the output of the first switch 34.

The operation of the space diversity receiving unit shown in FIG. 3 is described with reference to FIGS. 4A to 4G.

Figure 4:
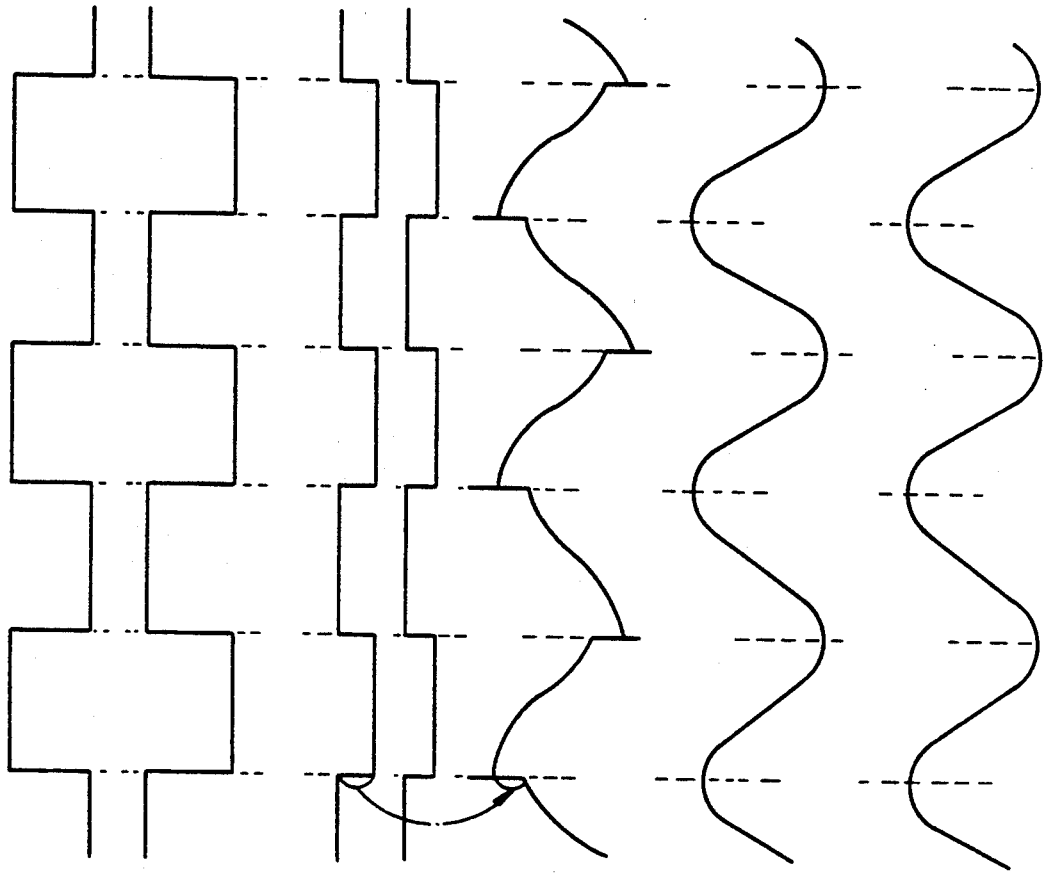
FIGS. 4A to 4G are waveform diagrams eplaining the operation of the unit shown in FIG. 3.

The comparator 33 compares the levels of the signals received by the antennas 31 and 32 to output a signal a shown in FIG. 4A. The inverter 35 inverts the signal 33 to output a signal b shown in FIG. 4B. The level adjusting unit 36 adjusts the level of the signal b to output a signal c shown in FIG. 4C. The level of the signal c is adjusted so as to cancel the switching noise generated in the switch 34. In the adding unit 37, the signal c is added to the output signal of the switch 34 so that an output signal e shown in FIG. 4F is obtained at the output of the adding unit 37. Thus, the output signal e does not include the switching noise.

In the output signal e, however, there are impulses at the switching points of the output signal e.

To remove the impulses from the output signal e, according to another aspect of the present invention, as illustrated by a dotted line in FIG. 3, another switch 38 is connected between the output of the comparator 33 and the input of the adding unit 37. In response to the ON level of the signal a, the voltage level $L_1$ is selected to be output; and in response to the OFF level of the signal a, the voltage level $L_2$ is selected to be output. The inversion of the output signal c' of the switch 38 includes the switching noise and the impulses which are substantially the same as the switching noise and the impulses generated by the first semiconductor switch 34.

By adding the switching noise and the impulses generated by the second semiconductor switch 38 to the output signal d of the first semiconductor switch 34, a smooth signal e' without the switching noise and the impulses can be obtained as shown in FIG. 4G.

Figure 5:
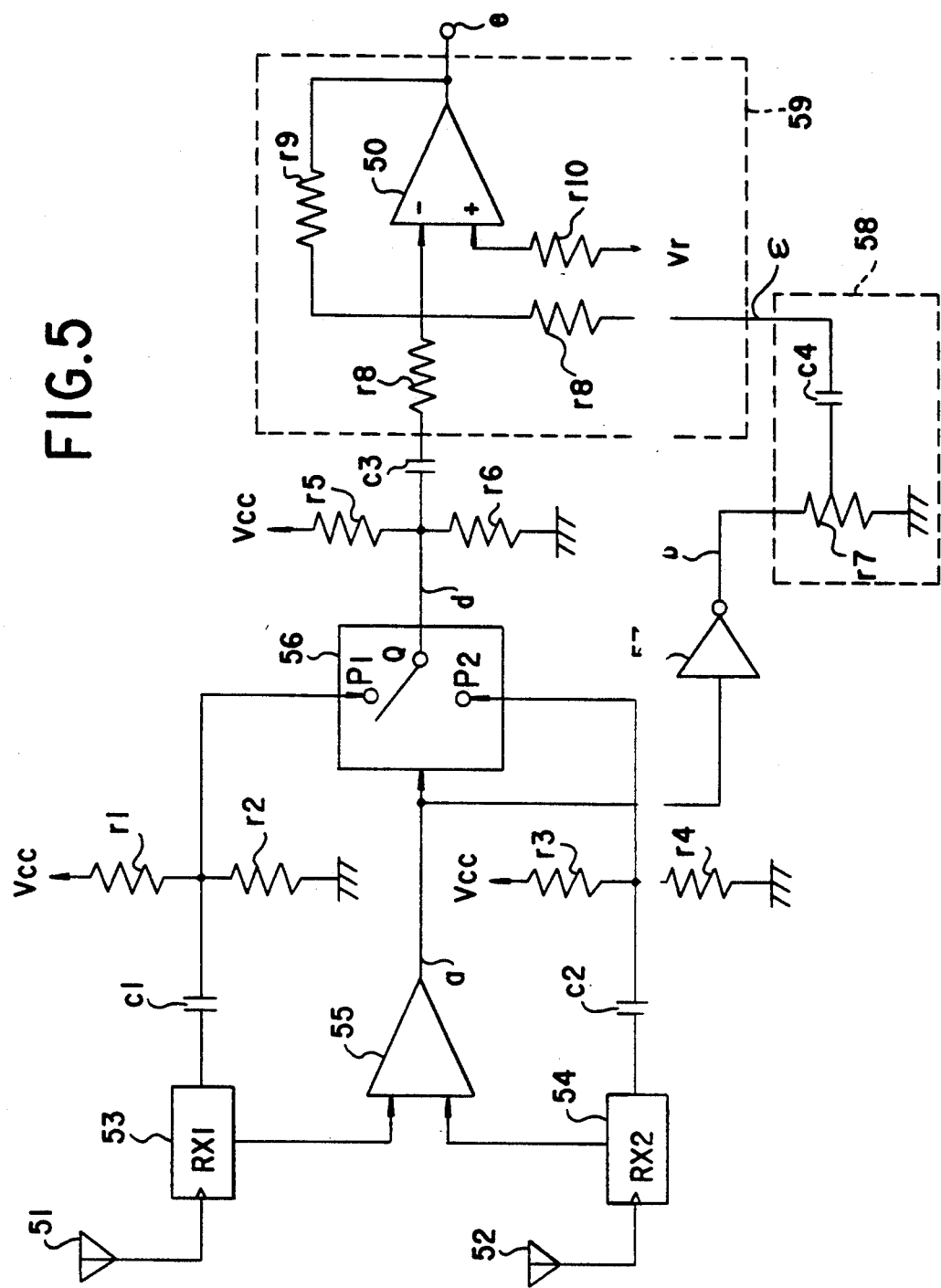
FIG. 5 is a circuit diagram showing a space diversity receiving unit according to an embodiment of the present invention.

FIG. 5 is a circuit diagram showing a space diversity receiving unit according to an embodiment of the present invention. In FIG. 5, 51 and 52 are space diversity antennas; 53 and 54 are receivers (RX1, RX2); c1 is a capacitor for cutting the direct current components from the output of the receiver (RX1) 53; r1 and r2 are resistors connected in series between a power supply Vcc and ground to form a bias circuit for an input terminal $P_1$ of a semiconductor switch 56; c2 is a capacitor for cutting the direct current components from the output of the receiver (RX2) 54; r3 and r4 are resistors connected in series between a power supply Vcc and ground to form a bias circuit for an input terminal $P_2$ of the semiconductor switch 56; 55 is a comparator for comparing the outputs of the receivers (RX1) 53 and (RX2) 54; 56 is a semiconductor switch for outputting the output of the receiver (RX1) 53 through the capacitor c1 or the output of the receiver (RX2) 54 through the capacitor c2, in response to the level of the output signal a of the comparator 55; 57 is an inverter for inverting the output of the comparator 55; 58 is a level adjusting unit for adjusting the output level of the inverter 57; 59 is an adding unit for adding the output of the switch 56 through a capacitor c3 and the output of the level adjusting unit 58; c3 is a capacitor for cutting the direct current components from the output of the switch 56; and r5 and r6 are resistors connected in series between a power supply Vcc and ground to form a bias circuit for an output terminal Q of the semiconductor switch 56.

The level adjusting unit 58 includes a variable resistor r7 and a capacitor c4 for cutting direct current components. The adding unit 59 includes input resistors r8 and r9 respectively connected to the capacitors c3 and c4, an operational amplifier 50 having an inverting input terminal commonly connected to the resistors r8 and r9, a feedback resistor r9 connected between the output terminal and the inverting input terminal of the operational amplifier 59, and an input resistor r10 for inputting a reference voltage Vr to a non-inverting input terminal of the operational amplifier 50.

In operation of the circuit shown in FIG. 5, the comparator 55 compares the demodulated levels from the receivers (RX1) 53 and (RX2) 54 to output a signal a similar to the signal a shown in FIG. 4A. The signal a is inverted by the inverter 57 so that a signal b similar to the signal b shown in FIG. 4B is output from the inverter 57. The level of the inverted signal b is adjusted by the variable resistor r7. From the adjusted output signal, direct current components are cut by the capacitor c2. Then, the signal through the capacitor c4 is applied through the resistor r9 to the inverting input terminal of the operational amplifier 50.

In the output signal d of the switch 56, switching noises as shown in FIG. 4E are included. The output signal d is applied, through the bias circuit consisting of the resistors r5 and r6, the capacitor c3 for cutting the direct current components, and the resistor r8, to the inverting input terminal of the operational amplifier 50.

Since the output signal c of the level adjusting unit 58 is previously set by adjusting the variable resistor r7 so as to cancel the level changing components from the output signal d of the switch 56, the operational amplifier 50 compared the signal without the level changing components with a reference voltage Vr to provide an output signal e as shown in FIG. 4F. In the signal e, there is no switching noise.

Figure 6:
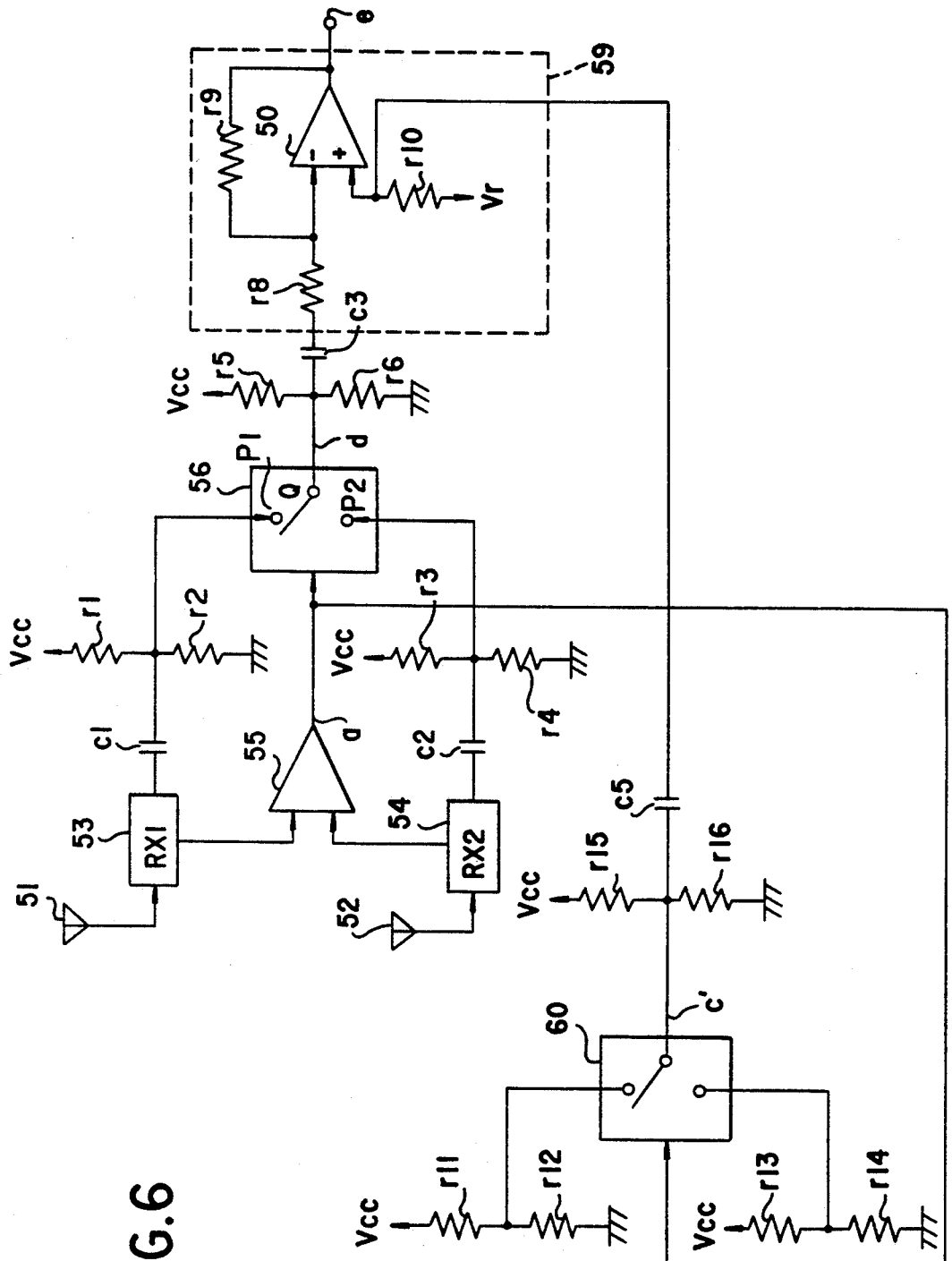
FIG. 6 is a circuit diagram showing a space diversity receiving unit according to another embodiment of the present invention.

FIG. 6 is a circuit diagram showing a space diversity receiving unit according to another embodiment of the present invention. In FIG. 6, the same parts as those in FIG. 5 are denoted by the same reference numerals. The difference between FIG. 5 and FIG. 6 is that, instead of the inverter 57 and the level adjusting circuit 58 in FIG. 5, the circuit shown in FIG. 6 includes another semiconductor switch 60, resistors r11 to r16, and a capacitor c5. The output of the comparator 55 is connected to a control terminal of the switch 60. The resistors r11 and r12 are connected in series between Vcc and ground to form a voltage dividing circuit. The resistors r13 and r14 are also connected in series between Vcc and ground to form a voltage dividing circuit. The divided direct current voltages $L_1$ and $L_2$ are applied to the input terminals $P_3$ and $P_4$ of the second semiconductor switch 60. In response to the signal a from the comparator 55, the switch 60 outputs the divided direct current voltage $L_1$ from the voltage dividing circuit consisting of the resistors r11 and r12 or the divided direct current voltage $L_2$ from the circuit consisting of the resistors r13 and r14. The output signal c' of the switch 60 includes, as shown in FIG. 4C, impulses. Namely, the two direct current signal levels applied to the switch 60 are appropriately determined so that the inversion of the output signal c, is the same as the switching noise generated by the first semiconductor switch 56.

The output of the second semiconductor switch 60 is connected to a middle point of a bias circuit consisting of the resistors r15 and r16 connected in series between the Vcc and ground. The direct current components are cut from the output signal of the switch 60 by the capacitor c5 connected to the middle point of the bias circuit. The output of the switch 60 is connected through the capacitor c5 to the noninverting input terminal of the operational amplifier 50. Thus, the output signal from the switch 60 through the capacitor c5 is synthesized with the reference voltage Vr. Similar to the embodiment shown in FIG. 5, the switching noise can be removed from the output signal d. In addition, in the embodiment shown in FIG. 6, since there are impulses in the cancelling signal c' due to the switching operation of the switch 60 as shown in FIG. 4D, the impulses can also be removed from the output signal d of the switch 56.

As described above, according to the present invention, in a space diversity receiving system, by inverting the output signal of the comparator for comparing the receiving signals and by adjusting the level of the inverted signal, or by selected either one of two appropriately determined direct current voltage levels in response to the output of the comparator and by adding the selected level to the selected receiving signal, the switching noise can be removed from the receiving signal so that the distortion rate of the system as a whole can be improved.

I claim:
1. A switching noise cancelling system in a space diversity receiving system, comprising:
   a comparator for comparing two receiving signal levels received by two antennas to provide a high level signal or a low level signal in response to the result of the comparison;
   a first switch, operatively connected to the output of said comparator and to said two antennas, for selecting, in response to the output signal of said comparator, one of two signals received by said antennas;
   noise generating means, operatively connected to the output of said comparator, for generating noises which are substantially the same as noises generated by said switch; and
   noise cancelling means, operatively connected to the outputs of said switch and said noise generating means, for cancelling the noises generated by said first switch by using said noises generated by said noise generating means, wherein said noise generating means comprises a level adjusting unit, operably connected to the output of said comparator, for generating said noises which are substantially the same as the noises generated by said first switch.

2. A switching noise cancelling system as cancelling in claim 1, wherein said first switch is a semiconductor switch.

3. A switching noise cancelling system as claimed in claim 1, wherein said noise generating means further comprises an inverter, operatively connected to the output of said comparator, for inverting the output signal of said comparator, wherein an output of said inverter is operably connected to said level adjusting unit.

4. A switching noise cancelling system as claimed in claim 1, wherein said noise cancelling means is an adding unit for adding the output of said first switch and the output of said noise generating means.

5. A switching noise cancelling system in a space diversity receiving system, comprising:
   a comparator for comparing two receiving signal levels received by two antennas to provide a high level signal or a low level signal in response to the result of the comparison;
   a first switch, operatively connected to the output of said comparator and to said two antennas, for selecting, in response to the output signal of said comparator, one of two signals received by said antennas;

noise generating means, operatively connected to the output of said comparator, for generating noises which are substantially the same as noises generated by said switch; and noise canceling means, operatively connected to the outputs of said switch and said noise generating means, for cancelling the noises generated by said first switch by using said noises generated by said noise generating means, wherein said noise generating means comprises:

a second switch, operatively connected to the output of said comparator and two direct current voltages, for selecting, in response to the high level signal or the low level signal of the output signal of said comparator, one or the other of said two direct current voltages, said two direct current voltages being so determined that the output of the second switch is substantially the same as the switching noise generated by said first switch.

* * * * *